(12) United States Patent
Chien et al.

(10) Patent No.: US 8,082,560 B2
(45) Date of Patent: Dec. 20, 2011

(54) DISC DRIVE WITH A SMALL-SIZED CIRCUIT BOARD

(75) Inventors: Yu-Feng Chien, Hsinchu (TW); Cheng Hua Chen, Hsinchu (TW); Yu-Nien Chen, Hsinchu (TW); Jeng-Wen Huang, Hsinchu (TW)

(73) Assignee: Lite-On IT Corp (TW)

( * ) Notice: Subject to any disclaimer, the term of this patent is extended or adjusted under 35 U.S.C. 154(b) by 1056 days.

(21) Appl. No.: 11/998,015

(22) Filed: Nov. 28, 2007

(65) Prior Publication Data
US 2008/0209455 A1 Aug. 28, 2008

(30) Foreign Application Priority Data
Feb. 28, 2007 (CN) .......................... 2007 1 0000487

(51) Int. Cl.
*G11B 33/12* (2006.01)

(52) U.S. Cl. ....................................... 720/652

(58) Field of Classification Search .................... 720/652
See application file for complete search history.

(56) References Cited

U.S. PATENT DOCUMENTS

| | | | | |
|---|---|---|---|---|
| 5,587,856 A * | 12/1996 | Aoyama | ................... | 360/99.02 |
| 6,351,343 B1 * | 2/2002 | Nakagawa et al. | ........ | 360/97.01 |
| 6,411,581 B1 * | 6/2002 | Saitou et al. | .................. | 720/652 |
| 6,910,218 B2 * | 6/2005 | Park et al. | ...................... | 720/653 |
| 6,961,202 B2 * | 11/2005 | Ikedo et al. | ................ | 360/77.02 |
| 7,010,799 B2 * | 3/2006 | Anno et al. | ..................... | 720/634 |
| 7,243,358 B2 * | 7/2007 | Bae | ................................ | 720/652 |
| 7,287,262 B2 * | 10/2007 | Omori et al. | .................. | 720/652 |
| 7,426,741 B2 * | 9/2008 | Muramatsu | .................... | 720/652 |
| 7,565,668 B2 * | 7/2009 | Guo | ................................ | 720/652 |
| 7,703,110 B2 * | 4/2010 | Murakami et al. | ............. | 720/653 |
| 2004/0111733 A1 * | 6/2004 | Bae | ................................ | 720/652 |
| 2006/0041897 A1 * | 2/2006 | Takahashi et al. | ............. | 720/652 |
| 2007/0124746 A1 * | 5/2007 | Shizuya et al. | ............... | 720/649 |

* cited by examiner

*Primary Examiner* — Brian Miller
(74) *Attorney, Agent, or Firm* — Raymond Sun

(57) ABSTRACT

A disc drive has a loader, a traverse, a circuit board and a supporting frame. The loader has a first side wall, a second side wall and a third side wall that is perpendicular to the first side wall and the second side wall. The circuit board has a first side, a second side and a third side that is perpendicular to the first side and the second side. The supporting frame extends from the second side wall of the loader and has a supporting surface. The third side of the circuit board is shorter than the third side wall of the loader, and the second side of the circuit board is disposed on the supporting surface of the supporting frame.

7 Claims, 5 Drawing Sheets

DISC DRIVE WITH A SMALL-SIZED CIRCUIT BOARD

FIELD OF THE INVENTION

The present invention relates to a disc drive, and more particularly to a disc drive with a circuit board having a reduced size.

BACKGROUND OF THE INVENTION

FIG. 1 is a partially exploded bottom view of a conventional disc drive 100 which includes a top cover 140, a bottom cover 150, a loader 110, and a traverse 120. The traverse 120 is set inside of the loader 110 and has a spindle motor and a pickup head disposed on it for rotating a disk and reading data on the disc separately. The top cover 140 covers the top of the loader 110, and the bottom cover 150 covers the bottom of the loader 110 and forms a space with the top cover 140. The traverse 120 can be sealed in the loader 110 by both the top cover 140 and the bottom cover 150.

The disc drive 100 further includes a circuit board 130 on which a central processing chip, a power-supply chip, a memory, and some necessary electronic components are disposed. The circuit board 130 connects electronically with the spindle motor and the pickup head disposed on the traverse 120 for controlling the rotation of the spindle motor and processing the data from the pickup head.

In the conventional disc drive 100, the loader 110 has two side walls 112, and there are several screw holes 116 on the bottom surface of the side walls 112. The circuit board 130 is set on the bottom of the two side walls 112, and then the bottom cover 150 covers the circuit board 130 so that the circuit board 130 is disposed between the bottom cover 150 and the bottom of the two side walls 112. Moreover, the disc drive 100 includes some screws 160 adapted to be inserted through corresponding screw holes 116 for securing the bottom cover 150 to the loader 110.

In the conventional disc drive, due to the limitation of the circuit layout technique, it is difficult to reduce the area of the circuit board, so the width of the circuit board is designed to be similar to the width of the loader. Therefore, the circuit board can be set on the side walls of the loader and secured by screws between the bottom cover and the loader, as shown in FIG. 1.

As technology progresses, the layout area of the chips and the circuit on the circuit board are gradually reduced. However, even if the circuit layout area can be reduced, the size of the circuit board cannot be reduced since the circuit board needs to be set on the side walls of the loader. In other words, the width of the circuit board still has to be similar to the width of the loader so as to assemble the circuit board on the loader in the traditional way, so that the cost of the circuit board does not decrease even as improvements are made in the relevant technical field. Therefore, if the size of the circuit board can be reduced without increasing the cost of the disc drive and without changing the original structure of the disc drive, it will not only decrease the cost of the circuit board, but can also increase market competition.

SUMMARY OF THE INVENTION

It is an object of the invention to provide a disc drive with a circuit board that is smaller than the circuit boards found in conventional disc drives. According the disc drive of the invention, a smaller-sized circuit board is positioned on a loader by an easy and low-cost way, and without changing the original structure of the disc drive, thereby decreasing the cost of the circuit board.

The objects of the present invention are accomplished by providing a disc drive having a loader, a traverse, a circuit board and a supporting frame. The loader has a first side wall, a second side wall and a third side wall that is perpendicular to the first side wall and the second side wall, with these three side walls forming an inner space. The traverse is disposed in the inner space of the loader and has a spindle motor and a pickup head disposed on it for rotating a disc and reading the data in the disc, respectively. The circuit board is electrically coupled to the pickup head for processing the data from the pickup head, and has a first side, a second side and a third side that is perpendicular to the first side and the second side. The supporting frame extends from the second side wall of the loader to the inner space and has a supporting surface. The third side of the circuit board is shorter than the third side wall of the loader, and the second side of the circuit board is disposed on the supporting surface of the supporting frame.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
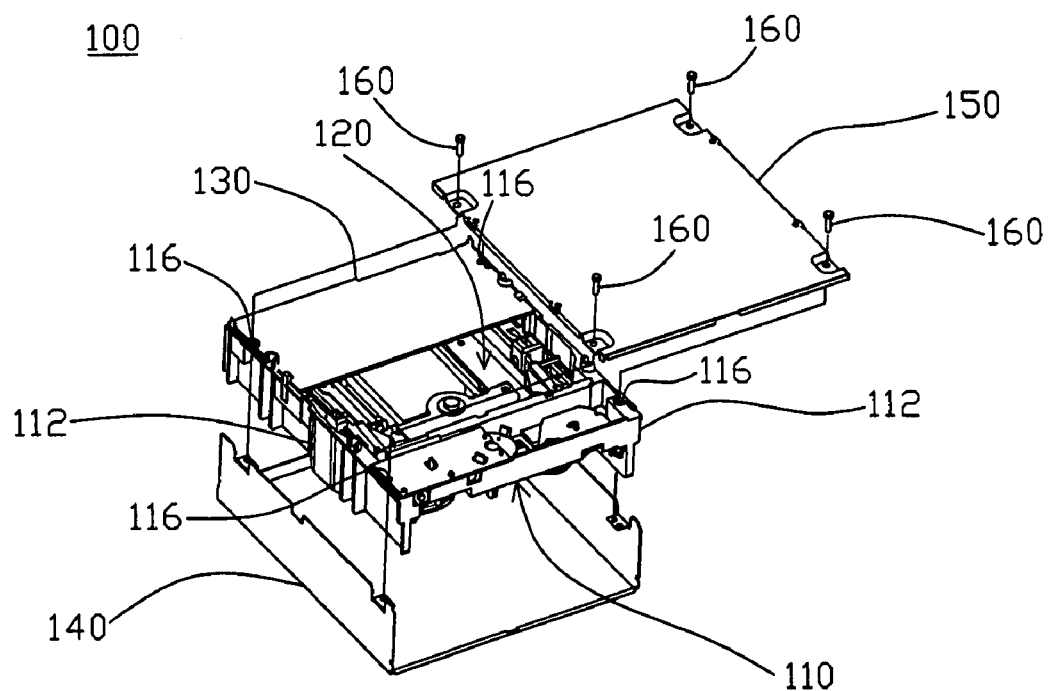
FIG. 1 illustrates a partially exploded bottom view of a conventional disc drive.
Figure 2:
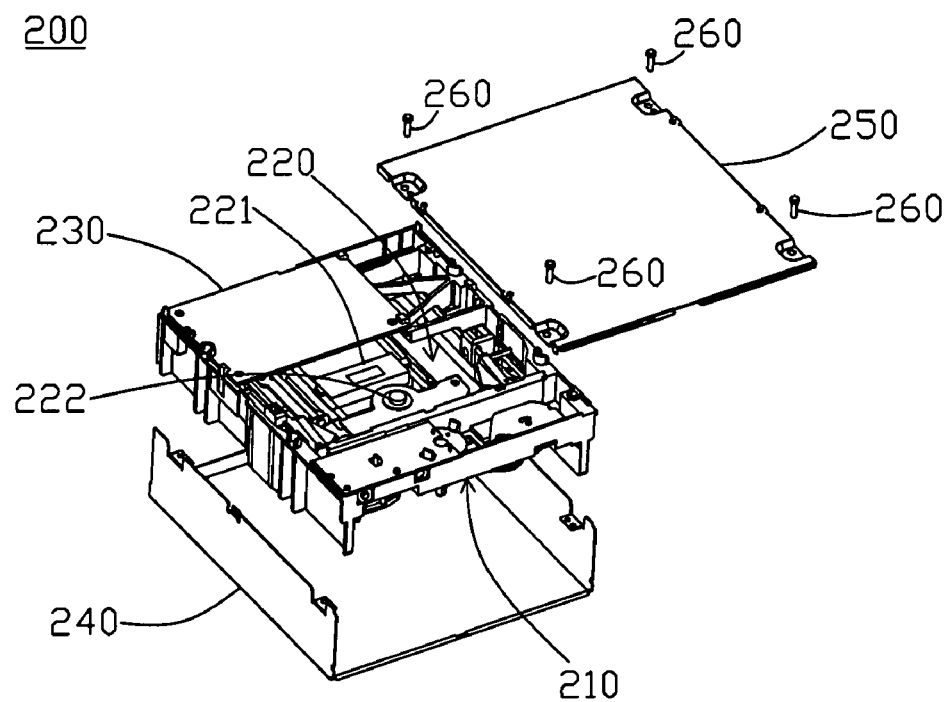
FIG. 2 illustrates a partially exploded bottom view of a first embodiment of a disc drive of the present invention.
Figure 3:
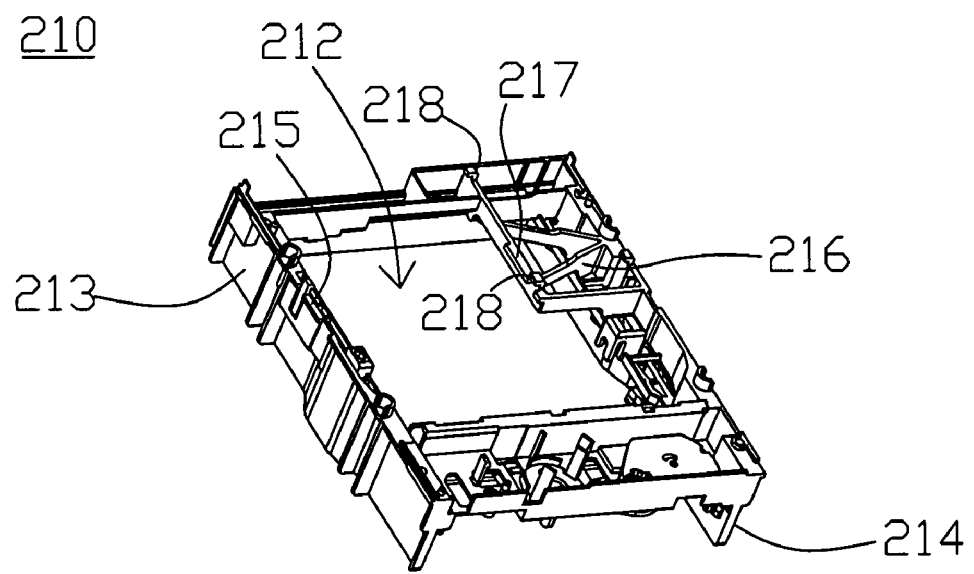
FIG. 3 illustrates a bottom view of a loader of the disc drive of FIG. 2.

The present invention is described in connection with FIGS. 2 and 3, with FIG. 2 showing a partially exploded bottom view of a disc drive 200 according to the first embodiment of the invention, and FIG. 3 showing a bottom view of a loader 210 of the disc drive 200.

The disc drive 200 includes a loader 210, a traverse 220, a circuit board 230, a top cover 240, and a bottom cover 250. The loader 210 defines an inner space 212, and the traverse 220 is positioned in the inner space 212 of the loader 210. A spindle motor 222 and a pickup head 221 are disposed on the traverse 220 for rotating a disc and for reading the data from the disc, respectively.

In this embodiment of the present invention, the circuit board 230 has a central processing chip, a power-supply chip, a memory, and other necessary and conventional electronic components. The circuit board 230 connects electronically with the spindle motor 222 and the pickup head 221 for controlling the rotation of the spindle motor 222 and processing the data from the pickup head 221, respectively. The top cover 240 covers the top of the loader 210, and the bottom cover 250 covers the bottom of the loader 210 and forms a space with the top cover 240. Further, the top cover 240, the bottom cover 250 and the loader 210 are assembled by a plurality of screws 260.

As shown in FIG. 3, the loader 210 has a first side wall 213 and a second side wall 214 which are generally parallel to each other. The first side wall 213 has a bottom surface 215 which is parallel to the surface of the disc loaded on the spindle motor 222. The second side wall 214 has a supporting frame 216 which is extended from the second side wall 214 into the inner space 212 of the loader 210. The supporting frame 216 has a supporting surface 217 which is generally parallel to the surface of the disc loaded on the spindle motor 222. The supporting frame 216 has at least one hook 218 for fastening the circuit board 230 on the supporting frame 216.

In this embodiment of the present invention, the supporting frame 216 and the loader 210 are provided in one piece. However, the supporting frame 216 can be provided separately from the loader 210 and fastened to the loader 210 by locking elements such as screws.

Figure 4:
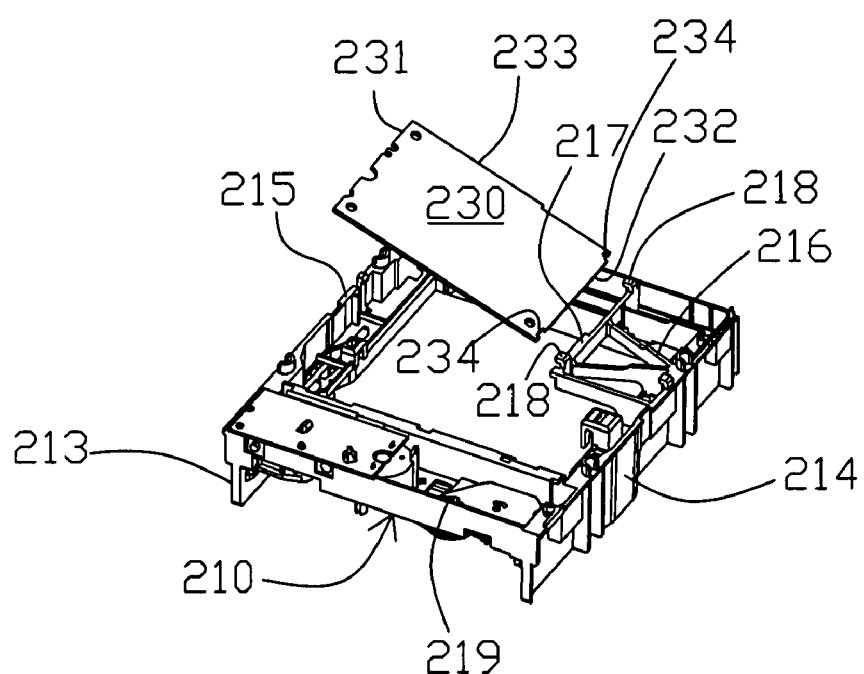
FIG. 4 illustrates an assembling view of a circuit board and the loader of the disc drive of FIG. 2.

FIG. 4 shows an assembling view of the circuit board 230 and the loader 210 of a first embodiment of the invention. The loader 210 further includes a third side wall 219 which is perpendicular to the first side wall 213 and the second side wall 214, and in fact, connects the side walls 213 and 214. The circuit board 230 has a generally rectangular shape, and has a first side 231, a second side 232, and a third side 233. The first side 231 is parallel to the second side 232, and the third side 233 is perpendicular to the first side 231 and the second side 232, and connects the first and second sides 231, 232.

In this embodiment, the width of the third side 233 of the circuit board 230 is less than the width of the third side wall 219 of the loader 210. The first side 231 of the circuit board 230 is secured on the bottom surface 215 of the first side wall 213 of the loader 210, and the second side 232 of the circuit board 230 is secured on the supporting surface 217 of the supporting frame 216. The circuit board 230 has at least one hooking hole 234 that is adapted to receive the hook 218, so that the hook 218 can be hooked on the hooking hole 234 to secure the circuit board 230 to the supporting frame 216.

When assembling the circuit board 230 to the supporting frame 216 and the loader 210, the second side 232 of the circuit board 230 is disposed on the supporting surface 217 of the supporting frame 216 first, and then the hooks 218 are hooked on the hooking holes 234 at the same time. Next, the first side 231 of the circuit board 230 is secured to the bottom surface 215 of the first side wall 213 of the loader 210. With the limitation of the hooks 218, the circuit board 230 is positioned between the loader 210 and the supporting frame 216 to avoid the circuit board 230 being disengaged either by shaking or for other reasons.

The bottom cover 250 covers the circuit board 230 and is fixed on the loader 210 by the screws 260 so that the first side 231 of the circuit board 230 is fastened between the bottom cover 250 and the first side wall 213 of the loader 210. Therefore, according to the disc drive of the invention, two sides of the circuit board 230 are respectively disposed on the loader 210 and the supporting frame 216, so as to decrease the probability that the circuit board 230 will become disengaged.

Figure 5:
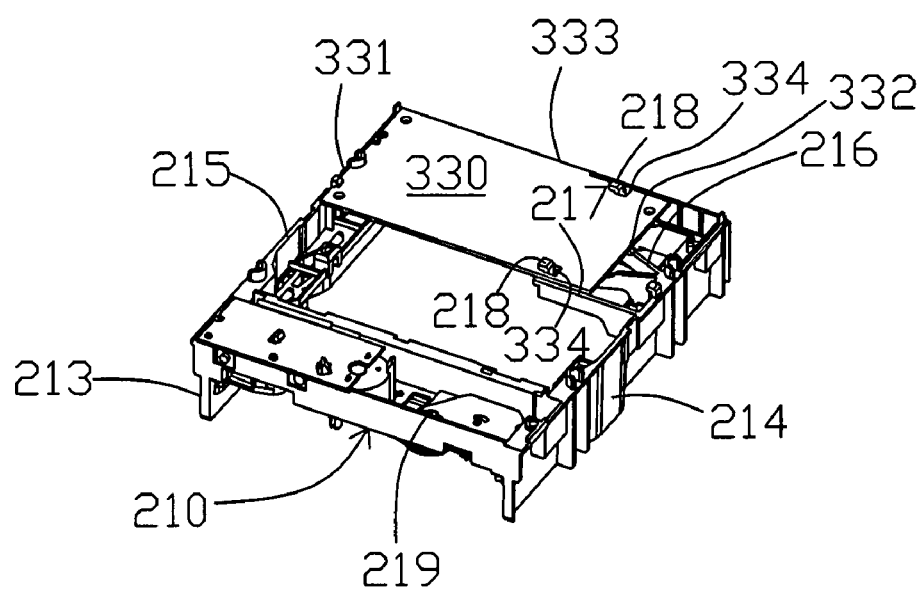
FIG. 5 illustrates a bottom view of a circuit board and a loader of a disc drive according to a second embodiment of the present invention.

FIG. 5 shows the bottom view of a circuit board 330 and a loader 210 according to a second embodiment of the invention.

The disc drive in the second embodiment of the invention is similar to the first embodiment shown in FIGS. 2-4, so the same numeral designations are used for the same elements in the embodiments of FIGS. 2-4 and FIG. 5. As with the first embodiment of the present invention, the disc drive of the second embodiment also includes a loader 210, a traverse 220, a circuit board 330, a top cover 240 and a bottom cover 250. The loader 210 has a first side wall 213 and a second side wall 214, and the first side wall 213 is generally parallel to the second side wall 214. The first side wall 213 has a bottom surface 215 which is parallel to the surface of the disc loaded on the spindle motor 222, and the second side wall 214 has a supporting frame 216 which extends from the second side wall 214 to the inner space 212 of the loader 210. The supporting frame 216 has a supporting surface 217 which is generally parallel to the surface of the disc loaded on the spindle motor 222. Moreover, the supporting frame 216 has at least one hook 218 for securing the circuit board 230 to the supporting frame 216.

The circuit board 330 in the second embodiment of the invention has a first side 331, a second side 332 and a third side 333. The first side 331 is parallel to the second side 232, and the third side 333 is perpendicular to, and connects, the first side 331 and the second side 332. The difference between the first and the second embodiment is that the width of the third side 333 of the circuit board 330 in the second embodiment is longer than that of the third side 233 of the circuit board 230 in the first embodiment. However, the width of the third side 333 of the circuit board 330 is still shorter than the width of the third side wall 219 of the loader 210. In addition, the supporting area of the circuit board 330 which is positioned on the supporting surface 217 of the supporting frame 216 is larger than that of the first embodiment. The circuit board 330 has at least one hooking hole 334 that is adapted to receive the hook 218, do that the hook 218 is hooked on the hooking hole 334 for securing the circuit board 330 on the supporting frame 216.

According to the disc drive of the invention, a supporting frame is extended from a loader towards an inner space of the loader to support a circuit board that has a smaller size than a circuit board which would otherwise span the entire width of the loader. Furthermore, according to the present invention, the supporting frame can be integrated with the loader, and no extra components like screws are needed to secure the circuit board to the supporting frame. The structure of the disc drive of the present invention is not changed, but the total cost of the circuit board, and the resulting disc drive, is decreased.

While the present invention has been particularly shown and described with reference to exemplary embodiments thereof, it will be understood by those of ordinary skill in the art that various changes and modifications may be made therein without departing from the spirit and scope of the present invention as defined by the following claims.

What is claimed is:

1. A disc drive, comprising:
   a loader having a first side wall, a second side wall and a third side wall that is perpendicular to the first side wall and the second side wall, with the first, second and third side walls forming an inner space;
   a traverse disposed in the inner space of the loader and having a spindle motor and a pickup head disposed on the traverse for rotating a disc and reading the data in the disc, respectively;
   a circuit board electrically coupled to the pickup head for processing the data from the pickup head, the circuit board having a first side, a second side and a third side that is perpendicular to the first side and the second side; and
   a supporting frame extending horizontally from the second side wall of the loader towards the inner space, and having a supporting surface;
   wherein the third side of the circuit board is shorter than the third side wall of the loader; and
   wherein the first side of the circuit board is disposed on the first side wall of the loader, and the second side of the circuit board is disposed on the supporting surface of the supporting frame with the circuit board extending horizontally inside the loader, wherein the supporting surface is provided on a first bar that extends from the third side wall, and the supporting frame comprises at least a second bar that extends from the second side wall to connect the first bar.

2. The disc drive of claim 1, wherein the first side wall has a bottom surface, and the first side of the circuit board is disposed on the bottom surface of the first side wall.

3. The disc drive of claim 1, wherein the supporting frame has at least one hook for securing the circuit board to the supporting frame.

4. The disc drive of claim 3, wherein the circuit board has at least one hooking hole that receives the hook of the supporting frame, with the hook passing though the hooking hole for securing the circuit board to the supporting frame.

5. The disc drive of claim 1 further comprising a bottom cover covering on the circuit board, wherein the first side of the circuit board is positioned between the bottom cover and the first side wall of the loader.

6. The disc drive of claim 5, wherein the bottom cover is locked on the loader by a plurality of screws.

7. The disc drive of claim 1, wherein the loader and the supporting frame are provided in one piece.

* * * * *